March 20, 1951
J. R. O'CONNELL
2,545,628
COLLET
Filed Jan. 9, 1947
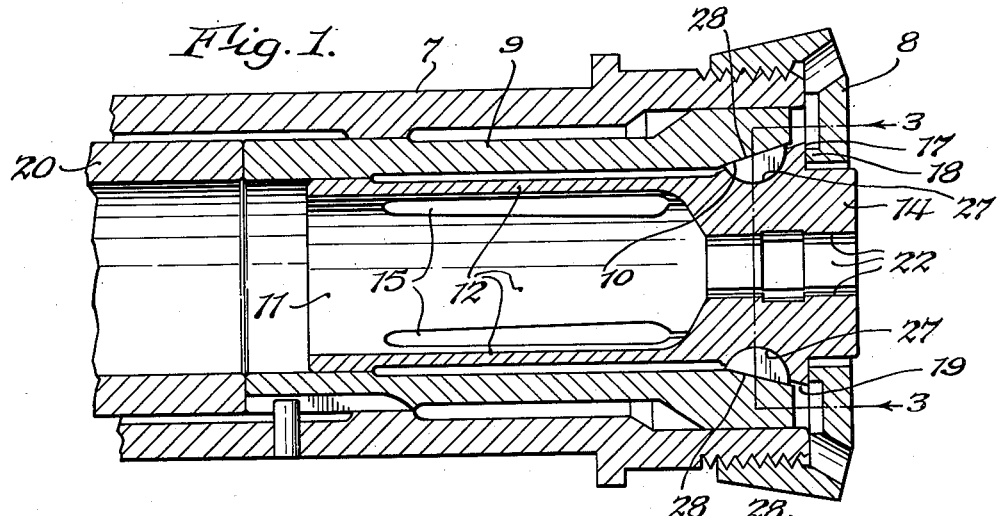
Fig. 1.
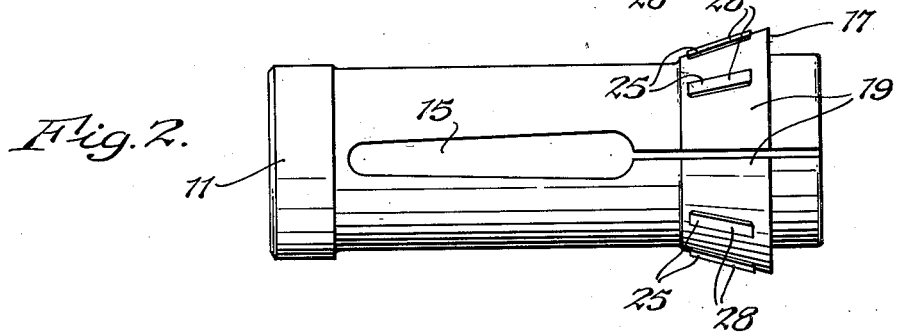
Fig. 2.
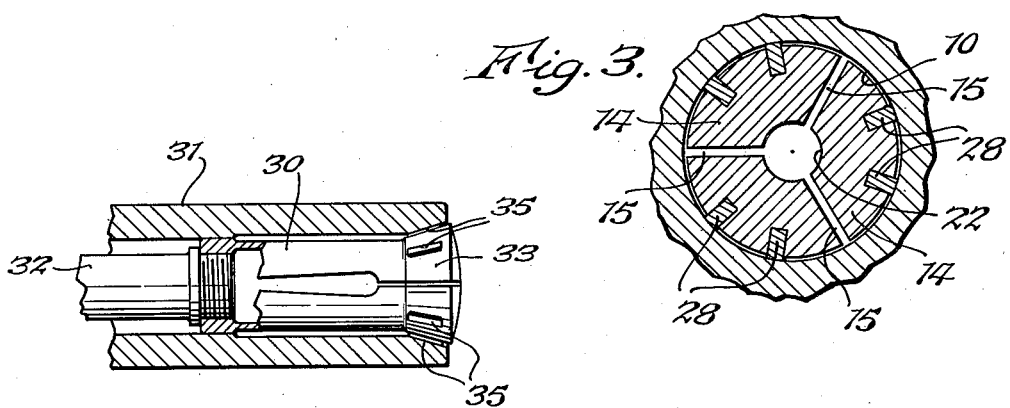
Fig. 3.
Fig. 4.
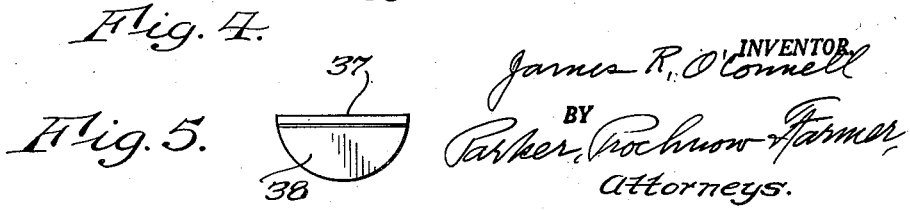
Fig. 5.
INVENTOR
James R. O'Connell
BY
Parker, Prochnow & Farmer
Attorneys.

Patented Mar. 20, 1951

2,545,628

UNITED STATES PATENT OFFICE 2,545,628

COLLET

James R. O'Connell, Elmira, N. Y., assignor to Hardinge Brothers, Inc., Elmira, N. Y.

Application January 9, 1947, Serial No. 720,957

11 Claims. (Cl. 279—50)

This invention relates to improvements in collets or chucks of the type commonly used on lathes, automatic screw machines and other machines and implements.

In collets or chucks of this type the jaws which grip the work are normally urged outwardly into work releasing positions by suitable resilient means, such for example as spring fingers which may be formed integral with the jaws, and the jaws have outer substantially frusto-conical or tapering surfaces which engage with a frusto-conical part of a lathe spindle or other machine part, so that when relative movement in one direction of the collet and the frusto-conical part takes place, the jaws will be moved toward each other into work gripping positions. Similarly when the relative movement of the collet and frusto-conical part is in the opposite direction, the pressure on the jaws is removed so that the spring fingers or other resilient means may urge the jaws outwardly into work releasing position. For the purpose of cooperating with the frusto-conical part in this manner, the outer surfaces of the jaws are generally made of substantially frusto-conical form or of a modified frusto-conical form.

One difficulty which has been encountered with collets of this type is that if the work to be gripped by the collet is of slightly smaller cross-sectional dimensions than that for which the collet is designed, then the substantially frusto-conical outer surface of the collet jaws must be drawn to a greater extent toward the converging end of the frusto-conical part with which the jaws cooperate, and this produces excessive friction and wear on the collet and its cooperating part due to the fact that only the edge portions of the frusto-conical jaw surfaces engage the frusto-conical part of the machine. When this occurs, a considerable percentage of the force employed for producing relative movement of the frusto-conical jaw and the collet is used in producing internal stresses within the jaws, and a relatively small portion of the force acting on the jaws served to grip the work. This action results from forcing portions of the jaws of larger radius into portions of the frusto-conical part of smaller radius. The same difficulty is also encountered when the work gripping surfaces of a collet have become worn, so that it is necessary for the jaws to move toward each other to a greater extent than when they were new, thus requiring the jaws to be drawn into the conical part to a greater extent, and consequently, again forcing parts of the jaws of greater radii of curvature into wedging engagement with parts of the frusto-conical parts of smaller radii. When these conditions arise in a machine, the operator generally adjusts the machine to exert greater force on the collet, which frequently results in damaging or breaking parts of the machine.

In order to overcome these difficulties, the outer surfaces of the jaws of collets have heretofore been made slightly non-circular in cross section with the edge portions of the jaws adjacent to the slots of slightly less diameter than the middle portions thereof. This construction is not satisfactory for the reason that the force required for moving the jaws into gripping positions is all exerted on the middle portions of the jaws with the result that these middle portions soon become worn so that the outer surfaces of the jaws again become substantially circular in cross section, so that the same difficulties heretofore described again arise. Furthermore the jaws of collets of this type are made with a taper slightly different than the taper of the part with which the jaws cooperate, so that the greatest pressure is exerted on outer ends of the jaws when the work engaging faces of the jaws become worn to a slight extent, the taper of the collet will fit the taper of the part with which it cooperates, and upon further wear of the outer ends of the work engaging faces, due to lateral pressures exerted on the work by the cutting tools, the tapered faces of the collet will bear at the inner parts of the jaws on the tapered portion of a cooperating machine part, resulting in a loose fit of the work at the outer end of the collet. This consequently causes "chattering" of the work during cutting and makes a correct cut impossible.

One of the objects of this invention is to provide a collet or chuck of improved construction which overcomes the difficulties heretofore encountered with collets and in which a greater portion of the force employed to produce relative movement between the collet and its cooperating frusto-conical part is used to move the jaws into gripping engagement with the work. A further object is to provide a collet which is so constructed that materially less force lengthwise of the collet is required to cause the collet jaws to grip the work with the required force, and which consequently requires less strain and less wear on the collet closing mechanism of the machine on which the collet is used. It is also an object of this invention to provide a collet which releases the work instantly when the lengthwise force on the collet is released. Another object of this invention is to provide a collet having bearing strips or pieces of hard material applied to the outer faces of the jaws to provide collets which are more efficient in the use of the force applied thereto and which are less subject to wear.

A further object is to provide bearing pieces or strips on the jaws or collets which are removable when worn and replaceable by other bearing or wear strips. Another object is to provide a collet of this type in which the bearing pieces are constructed so that they may pivot or swing to adapt themselves to bear evenly throughout their lengths on the part of the spindle with which the collet cooperates, and thus exert substantially uniform pressure on the work by the work engaging faces of the collet throughout the useful life of the collet. A further object of this invention is to provide bearing pieces or strips for the collets having the portions thereof which engage the frusto-conical part with which the collet cooperates provided with surfaces or portions of harder material.

Other objects and advantages of this invention will be apparent from the following description and claims.

In the accompanying drawings:

Fig. 1 is a longitudinal, central sectional elevation of a portion of a machine having a collet embodying this invention applied thereto.

Fig. 2 is a side view of the collet shown in Fig. 1, detached from the machine.

Fig. 3 is a fragmentary, transverse sectional elevation thereof, on line 3—3, Fig. 1.

Fig. 4 is a longitudinal, central sectional view of a different type of collet having improvements embodying my invention applied thereto.

Fig. 5 is a side view of a self-aligning bearing piece of modified construction.

My improvements may be applied to chucks or collets of many different types and by way of example, I have, consequently, shown my improvements applied only to two well known types of collets. It will be understood, however, that it is not intended to limit the use of this invention to the particular collets shown. In the collet construction shown in Figs. 1 to 3, 7 represents a machine spindle which has a cap or "shroud" 8 rigidly secured to the outer end of the spindle, for example, by screw threads. 9 represents a collet adapter or actuating member which is provided at its outer end with a frusto-conical inner bore 10, thus providing a bell mouth on the adapter or actuator. The collet which is used in this construction includes a substantially cylindrical portion 11, spring fingers 12 and jaws 14 formed integral with the ends of the spring fingers, the spring fingers and jaws being separated from each other by means of longitudinal slots 15.

The collet shown in Figs. 1 to 3 has three slots and, consequently, three jaws and spring fingers, but collets having any other desired number of jaws may be employed in connection with my improvements. The collet shown in Figs. 1 to 3 has an annular shoulder portion 17 formed to engage on an annular projection 18 formed on the cap 8 for the purpose of preventing the collet from moving outwardly with reference to the lathe spindle when the jaws thereof are contracted. The jaws of the collet are also provided on their outer surfaces with the usual substantially frusto-conical face 19 which, in collets as heretofore constructed, engaged the frusto-conical or bell mouth outer end part of the adapter or actuator 9. The collet adapter or actuator may be moved lengthwise of the lathe spindle by means of a push tube 20 which engages the inner end of the adapter.

It will be obvious that if the push tube 20 is moved to the right, it will impart similar motion to the adapter or actuator 9, resulting in the movement of the jaws 14 toward each other and into gripping engagement with any work that might be placed between the work engaging surfaces 22 of the collet. When the tube 20 is moved to the left in Fig. 1, the spring fingers 12 of the collet acting through the engaging frusto-conical surfaces of the collet and the bell mouth of the adapter 9, will cause this adapter to be moved to the left, thus permitting the jaws to move outwardly out of gripping engagement with the work.

In order to overcome the difficulties heretofore experienced in the use of collets and chucks which have been pointed out, I provide each jaw of the collet with one or more bearing pieces of hard material suitably mounted on the outer faces of the jaws of the collet. These bearing pieces are formed to engage the frusto-conical surface of the adapter or other member with which the collet cooperates and to keep the outer surface 19 of each jaw out of engagement with the frusto-conical surface. These bearing pieces may be of any suitable or desired construction, and are formed so that they extend beyond the outer substantially frusto-conical surfaces of the collet jaws and are spaced at considerable distances from those edges of the jaws which face the slots 15. Preferably these bearing pieces are in the form of strips 25 as shown, extending lengthwise of the collet, and slightly beyond the frusto-conical surfaces 19 of the collet jaws. It is also very desirable to arrange these bearing pieces on the collet in such a manner that they may be removed therefrom when worn, and replaced by other bearing pieces, so that the frusto-conical portion of the collet may, at all times, be kept out of engagement with the frusto-conical bell-mouthed part with which the collet cooperates. The outer faces of the bearing pieces are machined so that they have the same curvature as the frusto-conical part with which they cooperate.

The bearing pieces are preferably arranged in slots cut in the outer surfaces of the jaws. In order to produce the best results, the bearing pieces are preferably shaped similar to "Woodruff" keys, and consequently, the recesses 27 cut into the outer surfaces of the jaws are of arcuate circular shape, and the bearing pieces or strips are of similar shape so that the arcuate portions thereof extend into the arcuate slots with the flat outer faces 28 thereof extending beyond the frusto-conical surface 19 of the jaws. When this construction is employed, the bearing pieces are free to rotate or move into positions in which the outer faces thereof will be in accurate alignment with the surface of the frusto-conical part, so that the bearing pieces will bear throughout their lengths on the frusto-conical part, and will be self-aligning therewith.

In Fig. 4, I have shown my invention applied to a collet 30 of slightly different form which is intended to cooperate with a lathe spindle 31 having a frusto-conical or bell-mouthed part, with the inner surface of which the jaws of the collet may cooperate. This collet has a threaded engagement with a collet draw tube 32 which is moved lengthwise of the spindle to move the jaws of the collet into and out of engagement with the work. These jaws also have outer and substantially frusto-conical surfaces 33 which may be provided with bearing pieces or strips 35 which may be similar in construction to those described in connection with Figs. 1 to 3. Bearing pieces embodying my invention may be applied to the jaws of collets or chucks of other forms, and it is immaterial, so far as my invention is concerned whether the outer faces of the jaws converge or diverge outwardly.

The bearing pieces may be made of any suitable material which is sufficiently hard to withstand the pressures and wear to which they are subjected by the repeated opening and closing of the jaws of the collet. It is also possible, of course, to provide the outer surfaces only of the bearing strips or pieces with extremely hard surfaces, for example, as shown in Fig. 5, by securing a layer of tungsten carbide or other hard material 37 to the flat outer surfaces of bearing pieces 38.

While, of course, any desired number of these bearing pieces may be employed on each jaw of the collet, I found that very good results are obtained by providing two of these bearing pieces which are spaced at considerable distances from those edge portions of the jaws which face the slots 15.

In the operation of the collet provided with these bearing pieces, it will be obvious that as force is applied to the outer surfaces of the jaws of the collet, this force will act only through the bearing pieces, since other portions of the collet will be out of engagement with the frusto-conical part with which the collet cooperates. The bearing pieces may be located on the portions of the jaws of the collets where they are least subject to the binding action which results when the collet is required to grip the work piece of slightly smaller diameter than that for which it is designed, or when the work gripping surfaces 22 of the jaws become worn during use. The bearing pieces, consequently, are preferably placed near the outer middle portion of each jaw and at sufficient distances from the edges of the jaws facing the slots 15, so that no binding action of the collet jaws within the frusto-conical part can result. If the bearing pieces are made of harder material than the jaws of the collet or chuck, it will be obvious that increased life of the bearing pieces and of the collet and chuck will result. Furthermore, if the bearing pieces become worn, they may be easily removed and replaced by other bearing pieces. Since the bearing pieces extend outwardly beyond the outer surfaces of the jaws, these outer faces need not be machined with accuracy, since only the bearing pieces contact with the tapering surfaces of the lathe spindle or adapter. By constructing the bearing pieces so then they project beyond the outer faces of the jaws, that when the chuck is drawn into the frusto-conical part to a greater extent than was intended, the edge portions of the jaws adjacent to the slots 15 will not contact with the frusto-conical part, so that excessive friction will be avoided, and most of the force applied to produce relative movement of the chuck and the frusto-conical part will be used to grip the work. Consequently, bearing pieces as herein described greatly increase the efficiency of machines and tools on which chucks embodying my invention are used. Furthermore, when the work gripping surface 22 of a chuck or collet becomes worn, so that the jaws would ordinarily have to be moved toward each other to a greater extent, this wear can be compensated for by using bearing pieces which extend outwardly beyond the outer faces 19 of the jaws to a correspondingly greater extent, so that collets or chucks that would ordinarily be discarded, may be continued in use by means of my improvements.

By providing self-aligning bearing pieces, such as those shown with partly circular inner edges and by arranging them in correspondingly shaped slots extending lengthwise of the collet, the bearing pieces are free to adjust themselves to the angle of the taper of the frusto-conical machine part with which the collet cooperates, regardless of whether this angle is the same or different than the angle of the collet, and as the parts become worn, the bearing pieces are free to change their angular relations to the collet. It is consequently possible by means of my construction to have the collet throughout its life exert pressures on the work which are substantially uniform throughout the length of the work engaging faces of the collet.

In collets as heretofore made, it was customary to make the taper of the collet slightly different from the taper of the frusto-conical machine part with which the collet cooperates, and thus cause the collet to exert the greatest pressure on the work at the outer end of the collet. This was done not because it is desirable to grip the work in this manner, but to increase the life of the collet to some extent. After a small amount of wear, the collet would correctly fit the frusto-conical part and exert substantially equal pressure on the work throughout the length of the work engaging faces of the collet. However after further wear, the tapering faces of the collet would bear on the frusto-conical part mainly at their inner ends, thus exerting the greatest pressure on the work at the inner ends of the work engaging faces and consequently holding the work improperly and causing chattering during cutting. By means of my improved bearing pieces which can adjust themselves to different tapers, the work will be held with substantially uniform pressure lengthwise of the work engaging faces of the collet throughout the life of the collet. As the hole in the center of the collet in which the work is held becomes worn due to use, the outer end of the work engaging faces wear more rapidly than the inner ends, thus causing the collet to go deeper into the frusto-conical part. In collets as heretofore made, this results in pressure at the tapering parts of the collet jaws adjacent to the slots, with the resulting increase in friction between the collet and the frusto-conical part. However in my improved construction, the bearing pieces can shift or pivot in their partly circular grooves, and thus keep substantially equal pressure at the inner and outer ends of the work engaging faces. This enables the work to be properly held throughout the life of the collets, and greatly increases the useful life of the collets, as well as requiring less force to cause the collets to grip the work with the required pressure.

As a result of the construction shown and described, the bearing pieces are free to swing about their arc-shaped faces so that their outer straight faces can aline themselves with the tapered face with which they cooperate. This self-alining action of the bearing pieces enables the entire outer surfaces of the bearing pieces to seat on the internal tapered surface of the adapter 9 or lathe spindle 31, and consequently, force exerted lengthwise of the collet or adapter will be efficiently transmitted to the jaws to force them inwardly to grip the work. Consequently, very much less force in a longitudinal direction is required to cause the collet jaws to grip the work with the required force. This results in greatly reduced strains on the collet closing mechanism, and better holding of the work. The construction described also has the advantage that the collets constructed according to my invention release the work much more quickly when the lengthwise force tending to close the collet is released. This instant releasing of the work by the collet is important on machines operating at high speeds.

When collets as heretofore made are used on machines operating at high speeds, the large amount of force required to hold the work causes binding of the collet within the adapter or lathe spindle, and consequently, the collet jaws do not release quickly enough to enable the work on such machines to be advanced to the necessary extent during the brief opening period of the collet. This results in forming short pieces of work which have to be scrapped. My improved collet releases the work much more quickly, probably because of the fact that much less force is required to hold the work and because there is no binding of the collet in its cooperating member, and consequently, scrap resulting from improper feeding of the work is greatly reduced and in many cases eliminated.

By using my improved self-alining bearing pieces, the collets equipped with the same can be made with materially less spread of the fingers, so that the fingers when released move from the work to a less extent. This results in longer life of the collets and less breakage due to fatigue. The reduced spread of the spring fingers and jaws of the collet also results in greater accuracy as to concentricity and requires less power to close the collet.

I claim as my invention:

1. In a chuck having a plurality of work gripping jaws movable radially relatively to the axis of the chuck into and out of work gripping positions and having the outer surfaces of said jaws formed to cooperate with a part having an inner frusto-conical surface to move said jaws into and out of gripping engagement with the work by relative longitudinal movement of said jaws and said part, that improvement which includes bearing pieces on the outer surfaces of said jaws, which extend beyond the outer peripheries of said jaws for engagement with said frusto-conical surface, said bearing pieces having their outer faces curved to correspond to the curvature of said frusto-conical part which they engage.

2. In a chuck having a plurality of work gripping jaws movable radially relatively to the axis of the chuck into and out of work gripping positions and having the outer surfaces of said jaws formed to cooperate with a part having an inner frusto-conical surface to move said jaws into and out of gripping engagement with the work by relative longitudinal movement of said jaws and said part, that improvement which includes bearing pieces in the form of narrow strips extending lengthwise of the outer surfaces of said jaws and extending beyond the outer peripheries of said jaws for engagement with said frusto-conical surface, said bearing pieces being movably mounted on said jaws to aline themselves with said inner frusto-conical surface.

3. In a chuck having a plurality of work gripping jaws movable radially relatively to the axis of the chuck into and out of work gripping positions and having the outer surfaces of said jaws formed to cooperate with a part having an inner frusto-conical surface to move said jaws into and out of gripping engagement with the work by relative longitudinal movement of said jaws and said part, that improvement in which the outer surfaces of said jaws have grooves therein, and bearing pieces removably seated in said grooves and extending lengthwise of the outer surfaces of said jaws and extending beyond the outer peripheries of said jaws for engagement with said frusto-conical surface.

4. In a chuck having a plurality of work gripping jaws movable radially relatively to the axis of the chuck into and out of work gripping positions and having the outer surfaces of said jaws formed to cooperate with a part having an inner frusto-conical surface to move said jaws into and out of gripping engagement with the work by relative longitudinal movement of said jaws and said part, that improvement which includes bearing pieces in the form of narrow strips of material extending lengthwise of the outer surfaces of said jaws and extending beyond the outer peripheries of said jaws for engagement with said frusto-conical surface, and means for movably mounting said strips on said jaws to swing relatively to said jaws to aline themselves with said frusto-conical surface.

5. In a chuck having a plurality of work gripping jaws movable radially relatively to the axis of the chuck into and out of work gripping positions and having the outer surfaces of said jaws formed to cooperate with a part having an inner frusto-conical surface to move said jaws into and out of gripping engagement with the work by relative longitudinal movement of said jaws and said part, that improvement which includes a plurality of bearing pieces on the outer surface of each of said jaws, which extend beyond the outer periphery of said surface for engagement with said frusto-conical part, said bearing pieces being spaced from the edge portions of said jaws and having their outer surfaces curved according to the curvature of said frusto-conical part with which they engage.

6. In a chuck having a plurality of work gripping jaws movable radially relatively to the axis of the chuck into and out of work gripping positions and having the outer surfaces of said jaws formed to cooperate with a part having an inner frusto-conical surface to move said jaws into and out of gripping engagement with the work by relative longitudinal movement of said jaws and said part, that improvement in which the outer surfaces of said jaws have grooves therein with the bottoms of the grooves forming circular arcs, and bearing pieces seated in said grooves and having the portions thereof seated in said grooves forming circular arcs to seat on said bottoms of said grooves, said bearing pieces extending outwardly beyond said outer surfaces of said jaws for engagement with said frusto-conical part, said bearing pieces being shiftable in said grooves to enable said outer surfaces to contact throughout their lengths on said frusto conical part.

7. In a work gripping construction including a collet member having a plurality of jaws movable toward and from each other and each having inner work gripping surfaces and outer tapering surfaces, a cooperating member within which said collet member cooperates and which has an inner tapering surface for causing said jaws to move toward and from each other by relative lengthwise movement of said members, that improvement which includes bearing pieces on said collet jaws which project beyond the tapering surfaces of said jaws, and having faces for engaging with the tapering surface of said cooperating member, and mounted to move relatively to said jaws to enable said faces of said bearing pieces to aline themselves with the tapering surface of the cooperating member.

8. A work gripping construction according to claim 7, in which said bearing pieces are in the form of strips arranged in planes extending substantially lengthwise with reference to said collet member and having outer faces engaging the tapering surface of said cooperating member, said jaws having arc-shaped recesses into which said bearing pieces extend, and arc-shaped faces on said bearing pieces seated in said arc-shaped recesses of said jaws to enable said straight faces to aline themselves with the tapering surface of said cooperating member.

9. In a work gripping construction including a collet member having a plurality of jaws having inner work gripping surfaces and which are movable toward and from each other by lengthwise movement relatively to a cooperating member which has an inner tapering surface, that improvement which includes bearing pieces on said collet jaws which project beyond the outer surfaces of said jaws into engagement with said inner tapering surface, said bearing pieces being movably mounted on said jaws to enable the outer faces of said bearing pieces to aline themselves with the tapering surface of said cooperating member.

10. A collet for cooperating with an inner tapering surface of a cooperating member, said collet having a plurality of jaws movable toward each other and having inner work gripping surfaces, said collet having bearing pieces movably mounted on the outer surfaces of said jaws and projecting beyond said outer surfaces of said jaws and having outer faces formed for engaging with a tapering surface of a cooperating member, whereby said bearing pieces may move relatively to said jaws to aline themselves with the tapering surface of said cooperating member.

11. A collet having jaws provided with inner work gripping surfaces and formed to cooperate with a part having an inner tapering surface to move said jaws into and out of work gripping positions by relative longitudinal movement of said collet and said part, said jaws having recesses in the outer surfaces thereof, bearing pieces extending into said recesses and extending beyond the outer surfaces of said jaws for engagement with said tapering surface, and cooperating parts in said recesses and on said bearing pieces for enabling said bearing pieces to move relatively to said jaws to aline themselves with said tapering surface of said cooperating part.

JAMES R. O'CONNELL.

REFERENCES CITED

The following references are of record in the file of this patent:

UNITED STATES PATENTS

| Number | Name | Date |
|---|---|---|
| 460,601 | Skinner | Oct. 6, 1891 |
| 1,808,288 | Chapman et al. | June 2, 1931 |
| 2,337,400 | Maute | Dec. 21, 1943 |

OTHER REFERENCES

American Machinist's Handbook, Wartime Supplement, page 68. Copy in Division 52.

Science and Mechanics Magazine, August 1947, page 39. Copy in Division 52.